United States Patent
Agrawal

(10) Patent No.: US 11,176,310 B2
(45) Date of Patent: Nov. 16, 2021

(54) FACILITATING DYNAMIC DOCUMENT LAYOUT BY DETERMINING READING ORDER USING DOCUMENT CONTENT STREAM CUES

(71) Applicant: Adobe Inc., San Jose, CA (US)

(72) Inventor: Ram Bhushan Agrawal, Noida (IN)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/371,388

(22) Filed: Apr. 1, 2019

(65) Prior Publication Data

US 2020/0311185 A1    Oct. 1, 2020

(51) Int. Cl.
G06F 40/106    (2020.01)

(52) U.S. Cl.
CPC ................... *G06F 40/106* (2020.01)

(58) Field of Classification Search
CPC ...................................... G06F 40/103
See application file for complete search history.

(56) References Cited

U.S. PATENT DOCUMENTS

| | | | | | |
|---|---|---|---|---|---|
| 7,350,142 | B2 * | 3/2008 | Kraft | ................ | G06K 9/00463 715/210 |
| 7,392,473 | B2 * | 6/2008 | Meunier | ............ | G06K 9/00469 715/247 |
| 7,729,538 | B2 * | 6/2010 | Shilman | ................ | G06K 9/726 382/181 |
| 7,870,503 | B1 * | 1/2011 | Levy | .................... | G06F 40/103 715/783 |
| 8,176,414 | B1 * | 5/2012 | Baluja | .................... | G06F 16/93 715/238 |
| 8,473,467 | B2 * | 6/2013 | Levy | ....................... | G06F 40/14 707/694 |
| 8,539,342 | B1 * | 9/2013 | Lewis | ................... | G06F 40/106 715/243 |
| 8,769,395 | B2 * | 7/2014 | Boliek | .............. | G06K 9/00463 382/232 |
| 9,390,077 | B2 * | 7/2016 | Baluja | ................ | G06F 16/9577 |

(Continued)

OTHER PUBLICATIONS

Meunier, Jean-Luc, "Optimized XY-Cut for Determining a Page Reading Order", IEEE Xplore, Eighth International Conference on Document Analysis and Recognition, Aug.-Sep. 2005, 5 pages.

*Primary Examiner* — Scott T Baderman
*Assistant Examiner* — Benjamin Smith
(74) *Attorney, Agent, or Firm* — Kilpatrick Townsend & Stockton LLP

(57) ABSTRACT

Disclosed systems and methods determine a reading order of an electronic document. In an example, a document processing application accesses a content stream that includes a first object with a first location within the electronic document, a second object with a second location within the electronic document, and a third object with a third location within the electronic document. The application computes a region that includes the first object and the second object by determining that the second object is adjacent to the first object in a first dimension, at least a portion of the first and second objects are aligned in a second dimension, and the boundaries of the region do not intersect or encompass the third object. Based on the objects in the region, the application determines that a reading order should include the first object and the second object and should exclude the third object.

17 Claims, 13 Drawing Sheets

(56) References Cited

U.S. PATENT DOCUMENTS

| | | | |
|---|---|---|---|
| 9,569,407 B2* | 2/2017 | Xu | G06F 40/106 |
| 9,658,991 B2* | 5/2017 | Bruno | G06F 40/134 |
| 9,727,536 B2* | 8/2017 | Xu | G06F 40/205 |
| 10,031,892 B2* | 7/2018 | Briggs | G06F 40/106 |
| 10,146,419 B2* | 12/2018 | Geva | G06F 40/103 |
| 2003/0014445 A1* | 1/2003 | Formanek | G06F 16/9577 |
| | | | 715/247 |
| 2004/0114814 A1* | 6/2004 | Boliek | G06K 9/00463 |
| | | | 382/233 |
| 2005/0210371 A1* | 9/2005 | Pollock | G06K 9/00463 |
| | | | 715/212 |
| 2005/0210372 A1* | 9/2005 | Kraft | G06F 40/177 |
| | | | 715/205 |
| 2005/0229111 A1* | 10/2005 | Makela | G06F 3/0481 |
| | | | 715/802 |
| 2006/0045337 A1* | 3/2006 | Shilman | G06K 9/00402 |
| | | | 382/181 |
| 2006/0271847 A1* | 11/2006 | Meunier | G06K 9/00469 |
| | | | 715/205 |
| 2010/0011287 A1* | 1/2010 | Osaka | G06F 40/166 |
| | | | 715/251 |
| 2010/0174732 A1* | 7/2010 | Levy | G06F 40/40 |
| | | | 707/768 |
| 2014/0298164 A1* | 10/2014 | Terayoko | G06F 40/103 |
| | | | 715/243 |
| 2014/0337717 A1* | 11/2014 | Xu | G06F 40/106 |
| | | | 715/243 |
| 2014/0337719 A1* | 11/2014 | Xu | G06F 40/106 |
| | | | 715/255 |
| 2016/0085731 A1* | 3/2016 | Bruno | G06F 40/134 |
| | | | 715/205 |
| 2016/0292132 A1* | 10/2016 | Briggs | G06F 40/103 |
| 2017/0046317 A1* | 2/2017 | Geva | G06F 40/166 |
| 2019/0114063 A1* | 4/2019 | Geva | G06F 40/166 |

* cited by examiner

FACILITATING DYNAMIC DOCUMENT LAYOUT BY DETERMINING READING ORDER USING DOCUMENT CONTENT STREAM CUES

TECHNICAL FIELD

This disclosure relates generally to objects within vector images or documents. More specifically, but not by way of limitation, this disclosure involves facilitating dynamic layout by determining a reading order by using cues from a content stream and geometric features of the vector image or document.

BACKGROUND

Vector documents, such as documents in Portable Document Format (PDF), include multiple objects such as text boxes, figures, tables, headings, etc. But vector documents created with some software tools do not include a reading order of the document, that is, an order which objects such as text boxes or images the document would typically be read by a viewer of the document. Some vector documents include a content stream, which includes metadata describing a stream of objects in the document. But content streams do not typically correspond to a reading order.

Existing solutions for determining a reading order of a document analyze the text of the document. But these techniques, by limiting their analysis to text, do not account for how a presence of other objects such as images may impact the reading order. Other existing techniques for determining a reading order of a document involve analyzing simple document layouts involving a small number of objects. But these techniques fail to analyze more complex documents, such as documents for publishing that include multiple columns, rows, or section of a page.

Therefore, existing techniques may involve disadvantages for reasons such as (but not limited to) those described above.

SUMMARY

Systems and methods are disclosed herein for determining a reading order of an electronic document. In an example, a method involves accessing a content stream of an electronic document. The content stream includes a first object with a first location within the electronic document, a second object with a second location within the electronic document, and a third object with a third location within the electronic document. The method computes a region that includes the first object and the second object. Computing the region can involve determining, from the first location and the second location, that (i) the second object is adjacent to the first object in a first dimension, (ii) at least a portion of the first object and at least a portion of the second object are aligned in a second dimension, and (iii) boundaries of the region do not intersect or encompass the third object. Computing the region can further involve creating the region having the boundaries that exclude the third object from the region. The method further involves determining, based on the region encompassing the first object and the second object and excluding the third object, that a reading order should include the first object and the second object and should exclude the third object. The method further involves creating the reading order of the electronic document having the first object followed by the second object. The method further involves outputting a document layout for the electronic document that that positions the first object, the second object, and the third object according to the reading order.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings.

DETAILED DESCRIPTION

Figure 1:
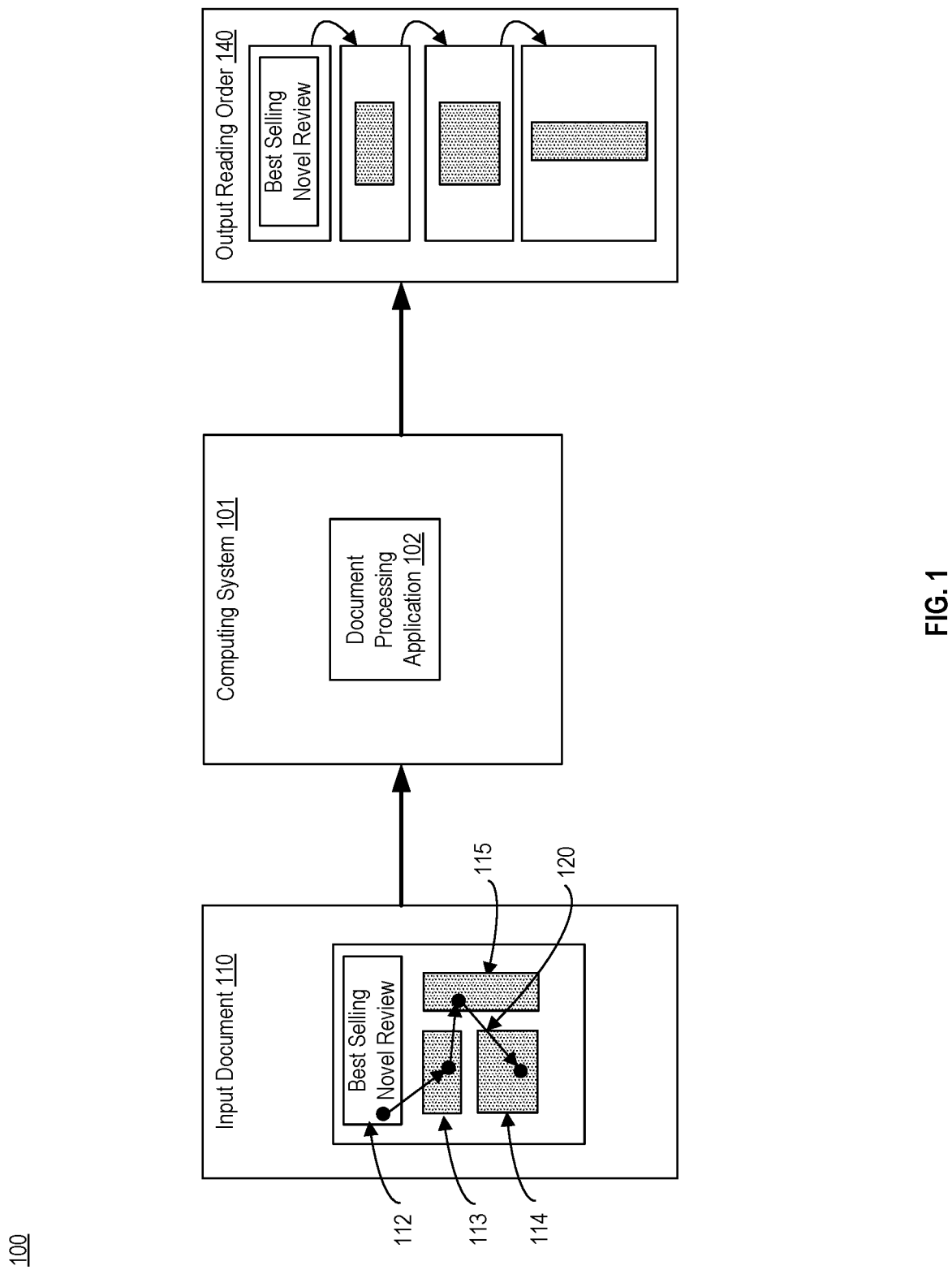
FIG. 1 is a diagram depicting an example of a document processing environment, according to an embodiment of the present disclosure.

The present disclosure includes embodiments for facilitating dynamic document layout by determining a reading order using content stream cues and geometric features of objects within a document. Determining a reading order enables mobile devices and accessibility software to dynamically generate a layout of an electronic document's content that corresponds to the reading order. As discussed above, existing solutions for analyzing vector documents such as Portable Desktop Format® (PDF) documents cannot accurately recreate a reading order. In contrast, certain embodiments described determining a reading order by forming regions of related objects. Regions are identified by analyzing a content stream for clues as to relatedness and analyzing geometric features of the document such as where the objects are located in relation to each other. In some cases, these regions are further organized into horizontal or vertical zones that each include one or more regions, where zones are identified by analyzing whitespace within the document.

The following non-limiting example is provided to introduce certain embodiments. In this example, a document processing application accesses a vector document that includes five objects (text boxes) and a content stream (or document sequence) that includes an ordering of the objects. Though the content stream typically exists to provide a computing system with a processing order for the objects, the document processing application can use the object order specified by the content stream to guide determination of a reading order of a document. The document processing application determines a reading order that reflects an order in which a reader would read the objects, such as column-by-column.

Continuing the example, the document processing application parses through the objects in the order in which they appear in the content stream. The document processing application uses the content stream to obtain cues about potential object groupings, though the content stream does not precisely specify which objects should be grouped together for reading-order purposes. In determining a reading order, the document processing application also analyzes the locations of the objects as rendered for display.

For example, the document processing application attempts to create a first region that includes the first and second objects, because these objects appear sequentially in the content stream. If a set of constraints are met, then the document processing application can add the second object to the first region. Here, the first and second objects are adjacent to each other vertically (e.g., one object is above the other) and are aligned horizontally. Horizontal alignment, or overlap, is reflected by a common value of an x coordinate between a portion of the first object and a portion of the second object. Further, the addition of the second object to the first region does not change the boundaries of the first region such that the boundaries intersect or encompass any additional objects, because the boundary can be created around the first and second objects in a vertical rectangle, without that rectangle encompassing any portion of the third, fourth, or fifth objects. As such, the document processing application groups the first and second objects into a first region, which indicates that these objects should be positioned near one another when generating a reading order for the document.

In a similar fashion, the document processing application determines that a third object and a fourth object (located to the right of the first and second objects), which are also sequential in the content stream and adjacent vertically, should be grouped into a second region. The document processing application groups the fifth object, located below the other objects and by itself, into a third region. To generate a reading order, the document processing application orders regions according to their position in the document (e.g., using horizontal or vertical zones, as discussed below), and orders objects within a region such that a first object is ordered before a second object that is lower on the page. This determination reflects an expected order in which the reader would view the text. The document processing application (a different software engine that receives the reading order from the software engine) modifies how content from the document is outputted on a presentation device. In one example, a layout is created in accordance with the reading order, where the layout is used by a computing device to render the various objects for display on a screen. In another example, an accessibility application uses the reading order to control how a speaker outputs an audio version of the content (e.g., orders the audio playback in accordance with the reading order). For example, in the absence of an accurate reading order, a one-column layout for a mobile device may sequence different sections of a document in an illogical order, or an audio readout generated by an accessibility application may play back different sections of a document in an incorrect order. By generating an accurate reading order, all objects can be correctly organized in a single column for easy scrolling on a mobile device, an accessibility application can use order an audio playback in accordance with the reading order, etc.

In some embodiments, the document processing application can augment the region determinations by identifying horizontal zones in the document, vertical zones in the document, or both. This determination of zones guides how different regions (each of which includes one or more grouped objects) are sequenced in a reading order. A horizontal zone refers to an area of a document identified by an area of whitespace (e.g., an area of the document with no objects) above or below a region. A vertical zone refers to an area of a document identified as separated an area of white space to the right or to the left of a region.

In the example above, the document processing application could identify an area of whitespace that is present across the page and is located below the first and second regions and above the third region. As such, the document processing application determines a first horizontal zone above the whitespace that encompasses the first and second regions, and a second horizontal zone below the whitespace that encompasses the third region below. When determining the reading order, all objects in regions from the first horizontal zone are positioned, in the reading order, before objects in regions from the second horizontal zone. Similarly, within a given horizontal zone, all objects in regions from an upper vertical zone are positioned, in the reading order, before objects in regions from a lower vertical zone. The determined reading order follows a common reading order of a user, e.g., reading all columns in one horizontal section (e.g., a story "above the fold" in a newspaper) before reading all columns in another horizontal section (e.g., a story "below the fold" in a newspaper).

Certain embodiments provide improvements to computing systems that generate layouts for organizing the content of electronic document for display on a display device. For instance, as noted above, existing techniques used by document-processing software often result in inaccurate or incomplete determinations of an electronic document's reading order to be used when performing content layout of the electronic document. These problems can be addressed by various features described herein. Certain embodiments base a reading order on identified regions that include related objects and by determining horizontal or vertical zones that guide a determination of a relative order of groups of objects that are in different zones. In this manner, certain embodiments create an accurate reading order, thereby avoiding the limitations of the existing solutions.

Certain Definitions

As used herein, "document" or "electronic document" refers to electronic data structure that includes data object with document content representation of a document. A particular data object within this electronic data structure includes a specific type of content to be displayed (e.g., plain text, rich text, image content, graphical content) and a category for the content (e.g., a title, main text, inset text, a figure, etc.).

As used herein, "object" or "instance" refers to a defined entity in a document. Examples include table of contents, title, header, text, image, table, flowchart, etc.

As used herein, "content stream" refers to metadata that is included in or associated with an electronic document and that describes an ordering of data objects within the electronic document. Depending on the particular document, parts of a content stream can be used in forming regions because parts of a content stream can include hints as to which objects might be related. In existing solutions, a content stream can be used as a relative order in which to render an object.

As used herein, "region" refers to a geographic area of a document that includes one or more related objects.

Turning now to the Figures, FIG. 1 is a diagram depicting an example of a document processing environment 100, according to an embodiment of the present disclosure. The document processing environment 100 includes one or more of input document 110, computing system 101, and output reading order 140. Computing system 101 can execute a document processing application 102 to determine a reading order for an input document 110 received by the computing system 101. Output reading order 140 depicts an order in which objects 112-115 are sequenced for output by a presentation device (e.g., a display screen, a speaker, etc.) after processing by computing system 101.

Input document 110 includes objects 112-115. Object 112 is a header of a document. Objects 113-115 can be any type of object such as a text box, image, a chart, a flowchart, or an image as an object. Content stream 120 represents an order in which objects 112-115 are rendered in input document 110. FIG. 1 depicts arrows, e.g., between object 112 and object 113, that indicate the order of the content stream 120. The document processing application 102 can generate or update metadata that describes or otherwise indicates the reading order. In various embodiments, this metadata is included within an output document or stored separately from and is associated with the output document.

More specifically, document processing application 102 uses content stream 120 in conjunction with geometric features of each of objects 112-115 to one or more regions and one or more zones that include the regions. From the determined zones and the regions, document processing application 102 can determine output reading order 140. Regions identify related objects that are likely to be read in sequence. Content stream 120 includes hints, or cues, that can guide document processing application 102 when determining the regions. The formation of regions is explained further with respect to FIG. 2. Zones are used as a guide to determine a relative order of groups of objects that are in different zones. The formation of zones is explained further with respect to FIGS. 3-6.

In an example, document processing application 102 accesses input document 110 via a file system or a memory. Document processing application 102 reads objects 112-115 and the content stream. Document processing application 102 attempts to create a first region that includes objects 112 and 113 by applying a set of criteria to objects 112 and 113. Here, while objects 112 and 113 are aligned vertically and overlap horizontally, adding object 113 to a region that includes object 112 would cause the region to intersect object 115. Therefore, document processing application 102 does not add object 113 to a region with object 112 and instead creates a first region with object 112 only.

Continuing the example, document processing application 102 attempts to create a region with the next objects in the stream, object 113 and object 114. Objects 113 and 114 are aligned vertically and overlap horizontally. Further, adding object 114 to a region including object 113 would not cause the region to intersect or overlap with any other objects. Therefore, document processing application 102 creates a second region that includes objects 113 and 114. Because object 115 is the last object in the stream, document processing application 102 creates a third region that includes object 115 only.

Next, document processing application 102 determines whether any horizontal zones should be created. If present, horizontal zones guide how different regions are organized into a reading order. A group of regions is positioned in the reading order based on where the associated horizontal zone is located on the page. For example, all regions in a first horizontal zone should be earlier in the reading order than all regions in a second horizontal zone. Continuing the example, document processing application 102 identifies a first horizontal zone that includes object 112 and a second horizontal zone that includes objects 113-115. The first and second horizontal zones are defined, in part, by a band of horizontal whitespace that naturally delimits objects 112-115 into regions.

Within the second horizontal zone, document processing application 102 identifies vertical zones. When present, vertical zones indicate a relative ordering of regions within a horizontal zone. Continuing the example, document processing application 102 creates a first vertical zone that includes objects 113-114 and a second vertical zone that includes object 115 only. When determining the reading order, a group of regions is positioned in the reading order based on where the associated vertical zone is located within the associated horizontal zone. For example, a group of regions in a left-most vertical zone appear before regions in a right-most vertical zone, and so on.

Using the determined horizontal and vertical regions, document processing application 102 determines a reading order by selecting objects from within a hierarchy of horizontal zones, vertical zones, and regions. For example, document processing application 102 orders horizontal zones from top to bottom and orders regions from within these horizontal zones accordingly. Therefore, in output reading order 140, objects from regions in the first horizontal zone appear before objects from regions in the second horizontal zone.

The specific ordering within a given horizontal zone depends on whether any vertical zones are present. Within each horizontal zone, document processing application 102 orders vertical zones from left to right. Therefore, continuing the example, within the second horizontal zone, regions from the first vertical zone are output before the regions from the second horizontal zone.

The specific ordering within a given vertical zone depends on the ordering of the regions. For example, within a given vertical zone, regions are accessed from left-to-right then from top-to-bottom. Therefore, continuing the example, the output reading order 140 is object 112, object 113, object 114, followed by object 115. Output reading order 140 reflects a desire on the part of a reader to read a title first, followed by the text that is vertically arranged in a first column on the left-hand side of the page, followed by the additional text that is vertically arranged in a second column of text that is located to the right of the first column, and so on.

A viewer application, which can include the document processing application 102 or be a separate application, generates a layout of content in the document based on output reading order 140. This layout can facilitate improved mobile viewing of the vector document or improved accessibility functions.

Variations are possible. More detail is provided with respect to the discussion that accompanies FIGS. 2-12. Additionally, as can be appreciated, such an ordering makes sense for languages that are left-to-right such as English, but can be altered for languages that are right-to-left such as Hebrew or Arabic. For example, instead of ordering vertical zones from left-to-right and the regions within a particular vertical zone from left-to-right, document processing application 102 can instead order the vertical zones from right-to-left and the regions within a particular vertical zone from right-to-left.

Because document processing application 102 determines a reading order that corresponds to positions of different objects and, in some cases, vertical and/or horizontal zones defined by whitespace in the document, document processing application 102 does not require an analysis of the contents of different objects (e.g., textual analysis of the text in various objects).

Figure 2:
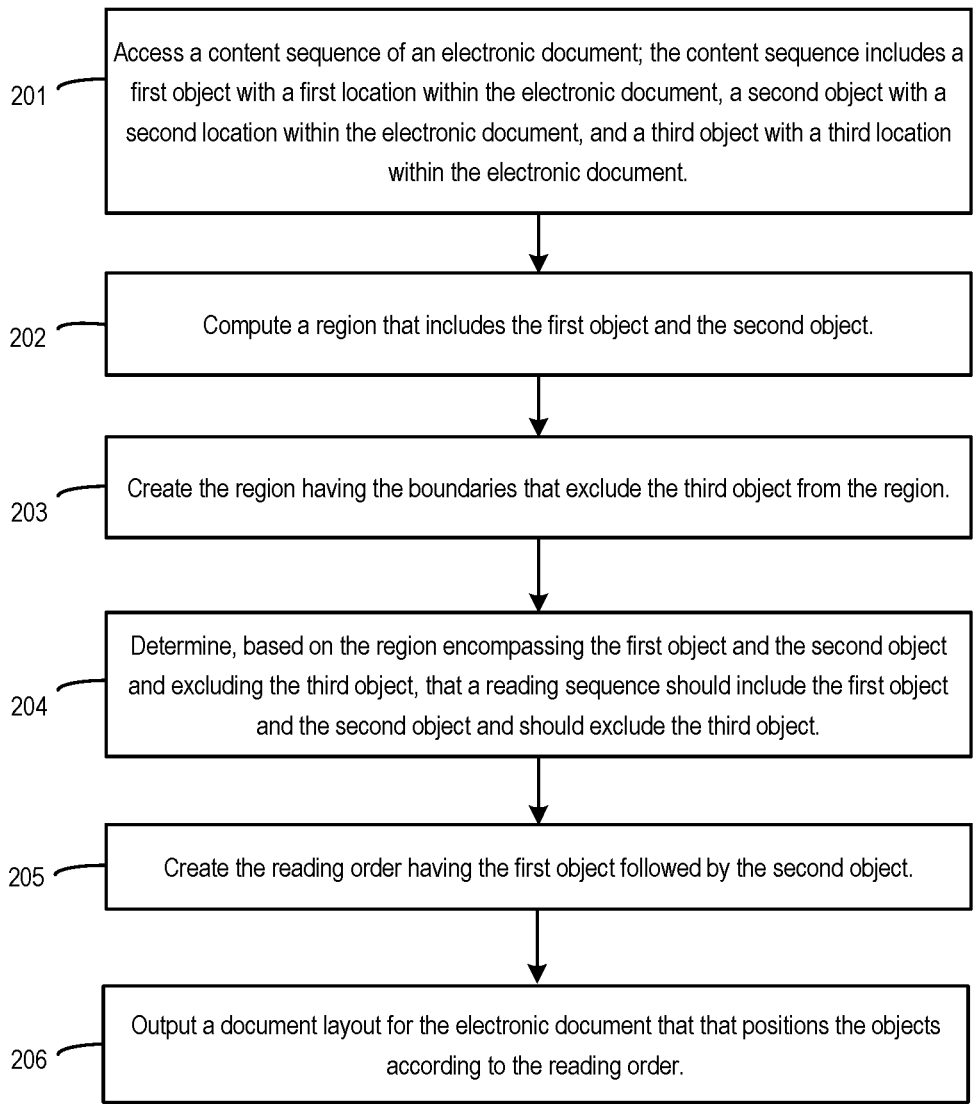
FIG. 2 is a flow chart depicting an example of a process for determining reading order using document content stream cues, according to an embodiment of the present disclosure.

FIG. 2 is a flow chart depicting an example of a process 200 for determining a reading order of an electronic document, according to an embodiment of the present disclosure. Blocks 202-205 of process 200 can implement a step for determining a reading order of the electronic document using regions derived from the content stream. Document processing application 102 can implement process 200.

At block 201, process 200 involves accessing a content stream of an electronic document. For example, document processing application 102 accesses the electronic document via a file system, a stream of data, or some other data source. The document processing application 102 obtains the content stream from metadata of the accessed electronic document.

Figure 3:
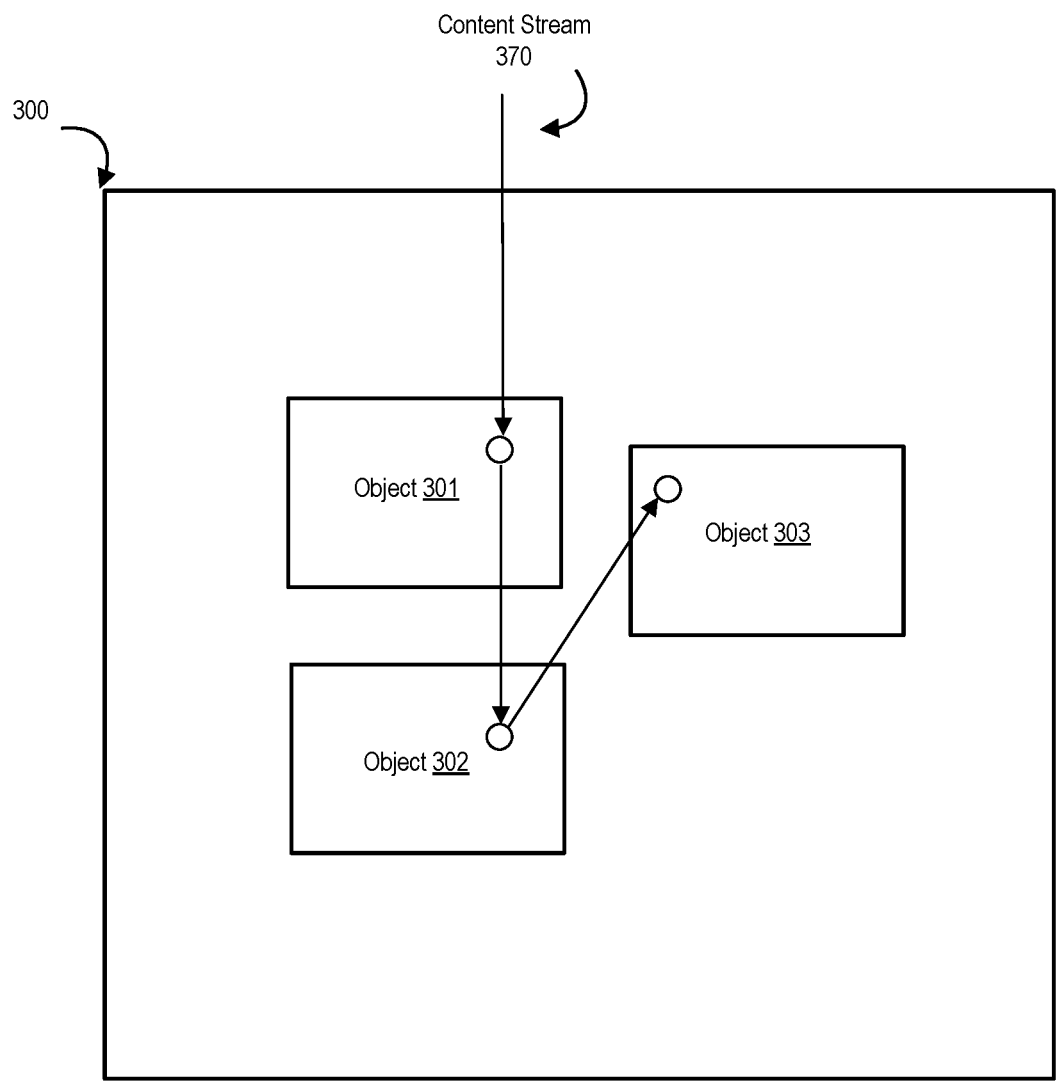
FIG. 3 is a diagram depicting an example of an electronic document with an associated content stream, according to an embodiment of the present disclosure.

For instance, FIG. 3 depicts an example of a content stream of an electronic document 300 that the document processing application 102 accesses at block 201. In this example, electronic document 300 includes objects 301-303 and content stream 370. Content stream 370 denotes an ordering of objects 301-303, specifically, object 301, object 302, followed by object 303. In this example, object 301 occurs before object 302 in the content stream 370 and, coincidentally, object 301 would be read before object 303 in English text or other text that is read from top to bottom and left to right. But this need not be the case, as explained further with the examples depicted in FIGS. 8-12.

Content stream 370 can provide clues to aid with determining a reading order, in that two objects that are adjacent in the content stream can indicate that the two objects are candidates for grouping into a particular region. For instance, objects 301 and 302 are adjacent in the content stream, therefore, the document processing application 102 can select the objects 301 and 302 and perform further analysis to determine whether these objects should be grouped into the same region.

Returning to FIG. 2, at block 202, process 200 involves computing a region that includes the first object and the second object. In the example depicted in FIG. 3, document processing application 102 considers the order of content stream 370 for a particular defined geographic region of the electronic document. Document processing application 102 starts with the first object in the content stream 370, object 301, and identifies the next object in content stream 370, object 302. Document processing application 102 considers objects 301 and 302 for assignment into the same region by evaluating a set of criteria.

A first criterion is adjacency in a first dimension. In FIG. 3, objects 301 and 302 are adjacent in the vertical dimension, as evidenced by object 302 being positioned below object 301 when electronic document 300 is rendered for display. More specifically, a portion of object 301 has a value of an y coordinate that is greater than the value of the y coordinate for a portion of object 302. Objects 301 and 302 therefore satisfy the first criteria of being adjacent to each other in a first dimension.

A second criterion is an overlap, at least partially, in a second dimension. For instance, in the horizontal dimension, a portion of object 301 has a value of an x coordinate that is identical to the value of the x coordinate for a portion of object 302. Thus, at least part of objects 301 and 302 horizontally overlap. Objects 301 and 302 therefore satisfy the second criteria of overlapping each other in a second dimension. By requiring that objects are adjacent in the vertical dimension and have overlap in the horizontal dimension, document processing application 102 determines regions that loosely fit a column structure.

In some embodiments, the overlap used in the second criterion is viewed as a common span between objects. For example, if a portion of object 301 has a value of a x coordinate that is identical to the value of the x coordinate for a portion of object 302, then objects 301 and 302 horizontally overlap. In some cases, document processing application 102 can require that the overlap criteria be satisfied only if an amount of common span is equal to or greater than the smallest of the widths of the objects. For example, if object 301 has a smaller width than object 302, and objects 301 and 302 have a number of points in common in the horizontal dimension that equals or is greater than the width of object 301, then this criterion could be met.

A third criterion for grouping first and second objects into a region is that the addition of the second object to the region would not require the region's boundaries to encompass any portion of a third object that violates the first and second criteria. For instance, in FIG. 3, a region could be defined by boundaries that would fully encompass objects 301 and 302, without those boundaries intersecting or encompassing object 303. Therefore, object 302 could be added to a region that includes object 301 without requiring that another object (e.g., object 303) be added to the region. By avoiding defining a region's boundaries so that additional objects (e.g., object 303) other than the objects under consideration (e.g., objects 301 and 302) are not included in the region, document processing application 102 ensures that additional objects that might not the first and second criteria described above are not added to the region. For instance, in FIG. 3, a region can be drawn that encompass objects 301 and 302, which meet the vertical adjacency and overlap criteria discussed above, without encompassing object 303, which meets the vertical adjacency criterion but lacks the horizontal overlap criterion.

In some cases, document processing application 102 can ignore this third criterion if the object that would inadvertently be added into the region (in this case, object 303) when creating a region with the two other objects (here, objects 301 and 302), is a non-text object. Examples of non-text objects include images and figures. Therefore, in the current example, if object 303 is an image, then document processing application 102 can add objects 301, 302, and 303 into one region.

Returning to FIG. 2, at block 203, process 200 involves creating the region having the boundaries that exclude the third object from the region. For instance, if the criteria from block 202 are satisfied, then document processing application 102 can add object 302 to a region that includes object 301. For example, document processing application 102 determines that that object 302 is adjacent to object 301 in the vertical dimension. The document processing application 102 also determines that at least a portion of object 301 and at least a portion of object 302 are aligned in the horizontal dimension. Document processing application 102 determines that the boundaries of the region do not intersect or encompass the object 303 (or any other objects), therefore a first region that encompasses objects 301 and 302 is created.

Figure 4:
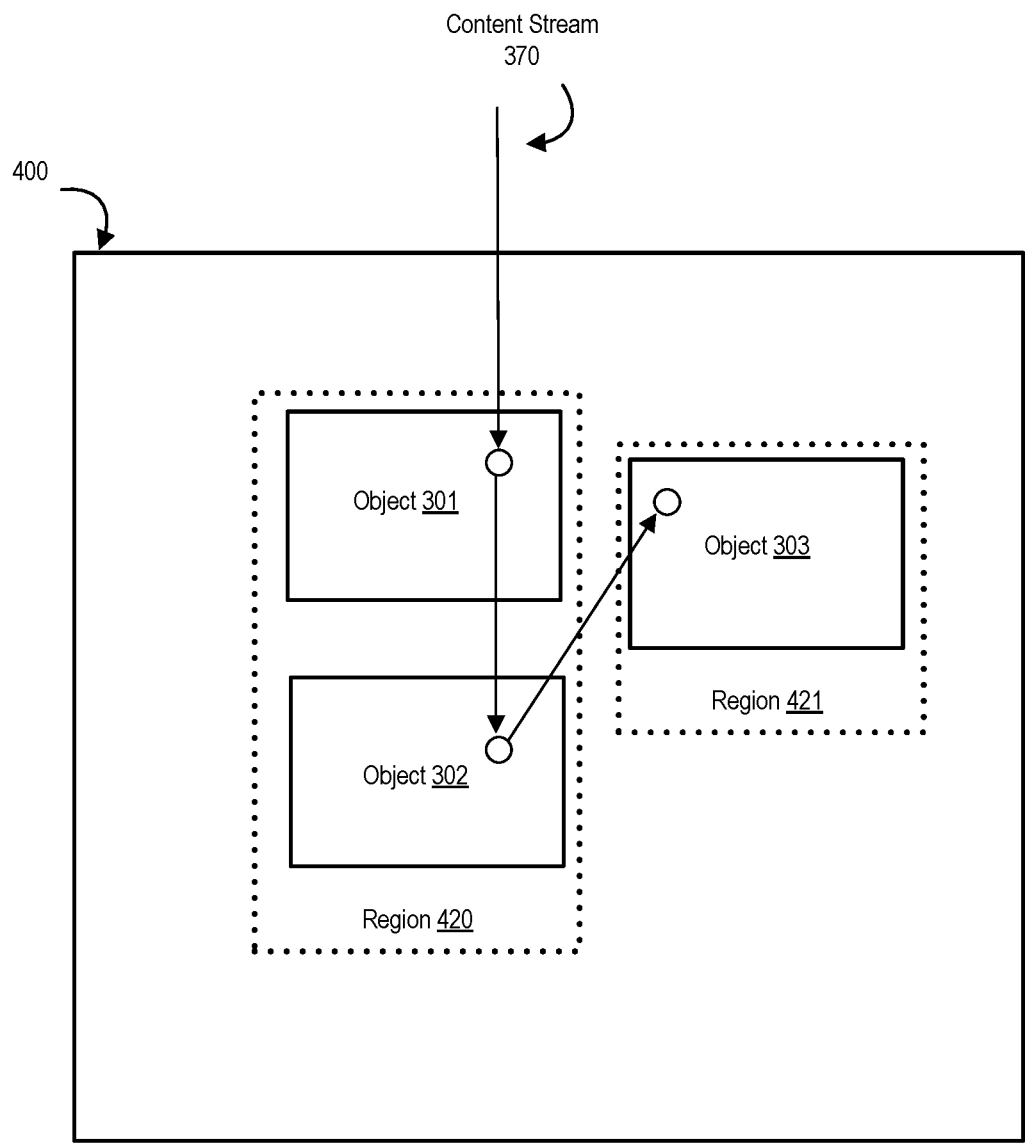
FIG. 4 is a diagram depicting an example of regions created within an electronic document, according to an embodiment of the present disclosure.

FIG. 4 depicts an example of regions that are created after applying the criteria above, e.g., after processing of block 203 has completed. In FIG. 4, electronic document 400 includes objects 301 and 302 that have been grouped into region 420 and object 303 that has been grouped into region 421. Regions 420-421 satisfy the criteria discussed above with respect to block 202 and are therefore created at block 203. For instance, at block 203, document processing application 102 creates region 420 that encompasses objects 301 and 302.

In some cases, document processing application 102 merges regions if one region completely contains another region. For example, a document includes three objects: two paragraphs and one image having smaller width than the paragraphs. The document layout is such that the first paragraph is first vertically, the image is second, below the paragraph, and the second paragraph is below the image. The content stream order is the image, first paragraph, then second paragraph.

The document processing application 102 first creates a region from the image, as the image appears first in the stream. Then, because the first paragraph is not below the image, the document processing application places the first paragraph into a second separate region. Because the second paragraph is below the first paragraph, the second paragraph is added to the second region. The second region now encompasses the first region (which contains only the image, which is between the two paragraphs). Hence, document processing application can merge the two regions.

By merging the second paragraph into the second region, the overlap of the image into a union rectangle was not considered because the image is a non-text region. In some cases, document processing application 102 can create a region with two objects that by creation includes a third object.

Returning to FIG. 2, at block 204, process 200 involves determining, based on the region encompassing the first object and the second object and excluding the third object, that a reading order should include the first object and the second object and should exclude the third object. In the example depicted in FIG. 4, the document processing application 102 could determine that region 420 should include objects 301 and 302 only. The document processing application 102 therefore determines that, in the reading order, objects 301 and 302 should follow one another.

Document processing application 102 can iteratively execute blocks 203-204 for other objects in the content stream. For example, document processing application 102 moves to the next object in the content stream 370, object 303. The document processing application 102 determines that no objects are present in the content stream after object 303. Accordingly, document processing application 102 determines that region 420 should be created that includes object 303 only. The document processing application 102 therefore creates region 420 having object 303 only.

At block 205, process 200 involves creating the reading order of the electronic document having the first object followed by the second object. Continuing the example, document processing application 102 creates a reading order by linking or outputting objects 301-303 in the order determined. For example, document processing application 102 can create a linked list that is object 301, object 302, followed by object 303. In other cases, the reading order involves directly outputting the objects in sequence, e.g., for rendering by a display. The rendering can be performed by a computing device, which may be different from the computing device that performs one or more operations of blocks 201-205, can generate a layout in which document objects are organized according to the reading order.

In some embodiments, process 200 involves outputting a document layout for the electronic document that that positions the objects according to the reading order, as depicted at block 206. Such a document layout can then be used to visually organize objects of the document according to the reading order. In a simplified example, all objects can be organized in a single column (e.g., for easy scrolling on a mobile device), with object 301 positioned first in the column, object 302 positioned next, and so on. In other embodiments, a step for determining a reading order using regions derived from the content stream of the electronic document can be performed without generating or outputting a document layout.

In some cases, document processing application 102 can parse the objects and identify additional objects from existing objects. For example, one object can be further separated or divided into multiple objects. For example, a document processing application 102 identifies a list and identifies each item within the list as a separate object. For example, if a single text object is identified as: "1. Go to the cupboard. 2. Open the cupboard. 3. Get out the cookies," such a text object can be divided into parts and considered as separate objects for the purpose of determining regions. Therefore, in the above example, document processing application 102 can consider (1), (2), and (3) as separate objects for the purpose of determining regions.

Advantages of this approach include computational efficiency when dealing with large regions or objects. For example, consider a case of a list of ten items. From the ten items, four are in at the bottom of a first column and the remaining six are carried over to the top of the next column. Having bounds of each list items presents a nicely separated case, and processing them can be straightforward. But if the entire list, split across two columns, were treated as one single object, the resulting box would be quite large, and would include both columns of text, potentially overlapping with other objects on the page.

In some embodiments, the document processing application 102 uses different zones within an electronic document, such as horizontal or vertical zones, to perform a rough grouping of different objects concurrently with or prior to performing region-determination operations described above with respect to FIG. 2. The document processing application 102 identifies these zones by analyzing the geometric features of the identified regions.

Figure 5:
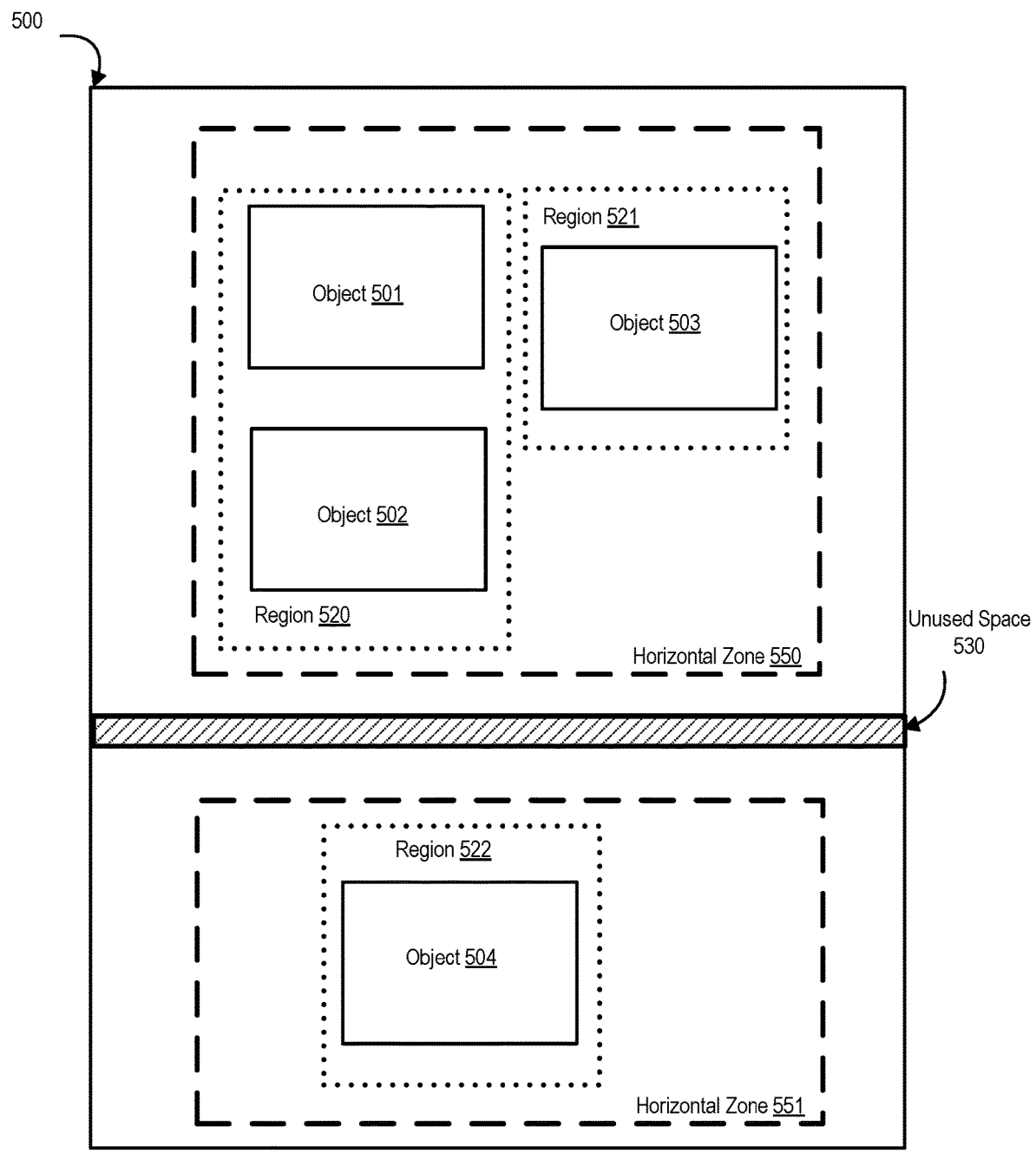
FIG. 5 is a diagram depicting an example of an electronic document with horizontal zones identified by a document processing application, according to an embodiment of the present disclosure.

FIG. 5 is a diagram depicting an example of an electronic document with horizontal zones identified by a document processing application, according to an embodiment of the present disclosure. FIG. 5 depicts any electronic document 500, which includes objects 501-504. Electronic document 500 also includes a region 520 that includes objects 501 and 502, a region 521 that includes object 503, and a region 522 that includes object 504. The regions 520-522 are identified and created via process 200.

Document processing application 102 analyzes electronic document 500 to determine a presence of an unused area of space. An example set of criteria is a presence of an area of unused space that meets the following requirements: (1) located across the electronic document in the horizontal dimension; and (2) adjacent to one or more regions in the vertical dimension.

Here, document processing application 102 identifies unused space 530 between regions 520-521 and region 522. This unused space 530 spans electronic document 500 with respect to the horizontal dimension, in that no text or other content interrupts the white space from the left horizontal boundary of the page to the right horizontal boundary of the page. This unused space 530 spans electronic document 500 is also vertically adjacent to regions 521 and 522. Thus, the document processing application 102 uses the unused space 530 as a delimiter to divide the page into horizontal zone 550, in which regions 520 and 521 are located, and horizontal zone 551, in which region 522 is located.

In additional or alternative embodiments, the document processing application 102 identifies vertical zones. In some cases, vertical zones can be identified within horizontal zones. In one example, the document processing application 102 identifies, as a vertical zone containing one or more regions, a portion of a page in which a horizontal zone has been identified, unused space extends along a vertical dimension between upper and lower boundaries of the horizontal zone, and the unused space is located between at least wo regions within the horizontal zone. In other cases, a document may have identified vertical zones but no horizontal zones. For example, a document may have no identifiable areas of horizontal white space but an identifiable area of vertical space in the middle of a page within two identifiable vertical zones.

Figure 6:
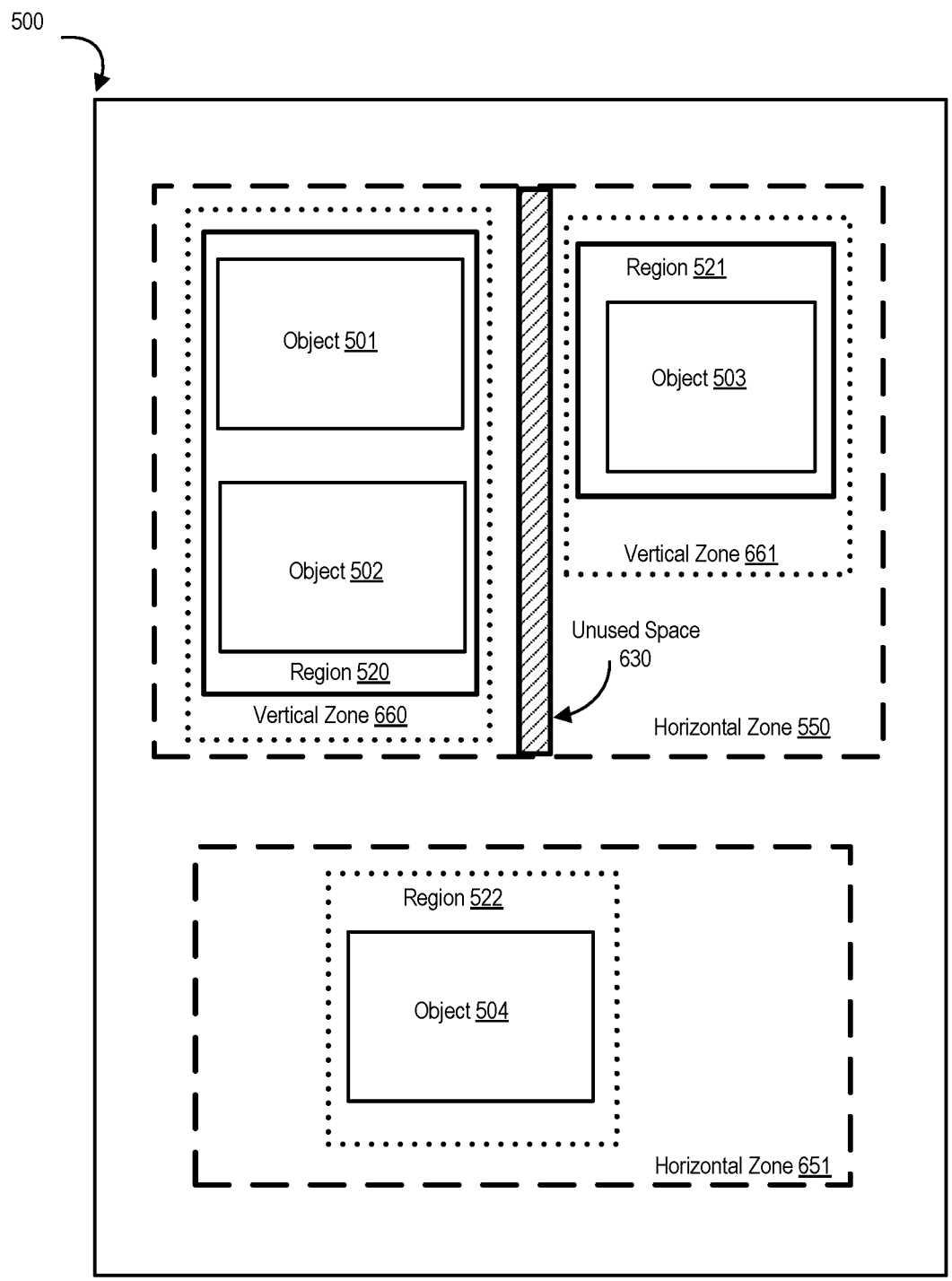
FIG. 6 is a diagram depicting an example of an electronic document with vertical zones identified by a document processing application, according to an embodiment of the present disclosure.

For instance, FIG. 6 depicts electronic document 600, which is an example of the electronic document 500 with vertical zones identified by a document processing application. In this example, the document processing application 102 determines that an area of unused space 630 exists in the horizontal zone 550. The document processing application 102 also determines that the unused space 630 extends from an upper boundary of the horizontal zone 550 to a lower boundary of the horizontal zone 550. The document processing application 102 also determines that the unused space 630 extends between regions 520 and 521. As such, document processing application creates, within horizontal zone 550, a vertical zone 660 including region 521 and a vertical zone 661 including region 520.

In embodiments involving horizontal zones, vertical zones, or both, the document processing application 102 uses one or more of these zones to determine a reading order. In one example, the document processing application 102 processes the horizontal zones in a vertical order. For instance, if the document includes two horizontal zones, any region within a first horizontal zone located on the top of a page will be positioned, in a reading order, before any region within a second horizontal zone located on the bottom of a page. The document processing application 102 processes the vertical zones in a horizontal order. For instance, if a particular horizontal zone includes two vertical zones, any region within a first vertical zone located on the left-hand side of a page will be positioned, in a reading order, before any region within a second vertical zone located on the right-hand side of a page.

The document processing application 102 also processes regions within each vertical zone according to whether the regions have any vertical overlap. For example, if two regions have a common vertical overlap, then the regions are ordered from left-to-right. Vertical overlap is indicated by a common vertical span. For example, if a portion of a first object has a value of a y coordinate that is identical to the value of the y coordinate for a portion of a second object, then the first and second objects overlap. If no vertical overlap exists, then regions are ordered from top-to-bottom.

Figure 7:
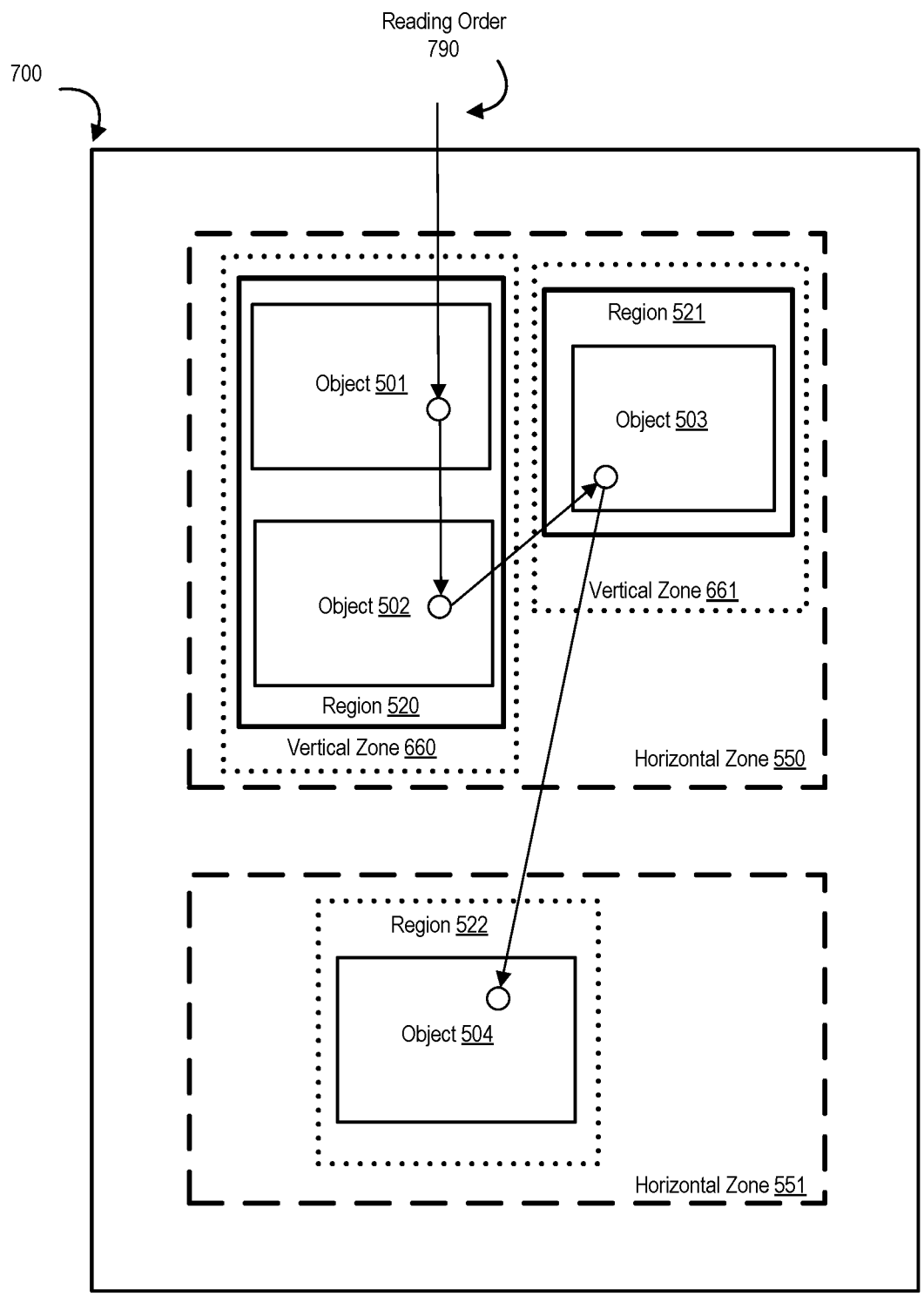
FIG. 7 is a diagram depicting an example of an electronic document with an identified reading order, according to an embodiment of the present disclosure.

FIG. 7 depicts an example of the electronic document 500 with a reading order 790 identified using the horizontal zones 550-551 and the vertical zones 660-661. To generate the reading order 790, the document processing application 102 accesses horizontal zone 550 (i.e., the upper horizontal zone), followed by horizontal zone 651 (i.e., the lower horizontal zone). Within horizontal zone 550, document processing application 102 accesses vertical zone 660 (i.e., the left-hand vertical zone) followed by vertical zone 661 (i.e., the right-hand vertical zone).

Within each vertical zone, document processing application 102 determines whether any vertical alignment exists. For instance, vertical zone 660 includes only one region 520, that includes two objects, object 501 and object 502. The document processing application 102 determines that objects 501 and 502 do not have any horizontal alignment. The document processing application 102 therefore orders objects 501 and 502 from top-to-bottom, such that object 501 is followed by object 502 in the reading order 790. Furthermore, the document processing application 102 also orders the object 503 (i.e., the only object in the vertical zone 661) after the object 502 because the vertical zone 661 is positioned to the right of the vertical zone 660 in the horizontal zone 550. Furthermore, document processing application 102 orders object 504 (i.e., the only object in the region 521 within the horizontal zone 551), after the object 503 because the horizontal zone 551 is positioned below the horizontal zone 550. Thus, the document processing application 102 outputs a reading order that is object 501, object 502, object 503, and object 504.

FIGS. 8-12 illustrate an example of processing an electronic document with more objects than the documents described with respect to FIGS. 3-7.

Figure 8:
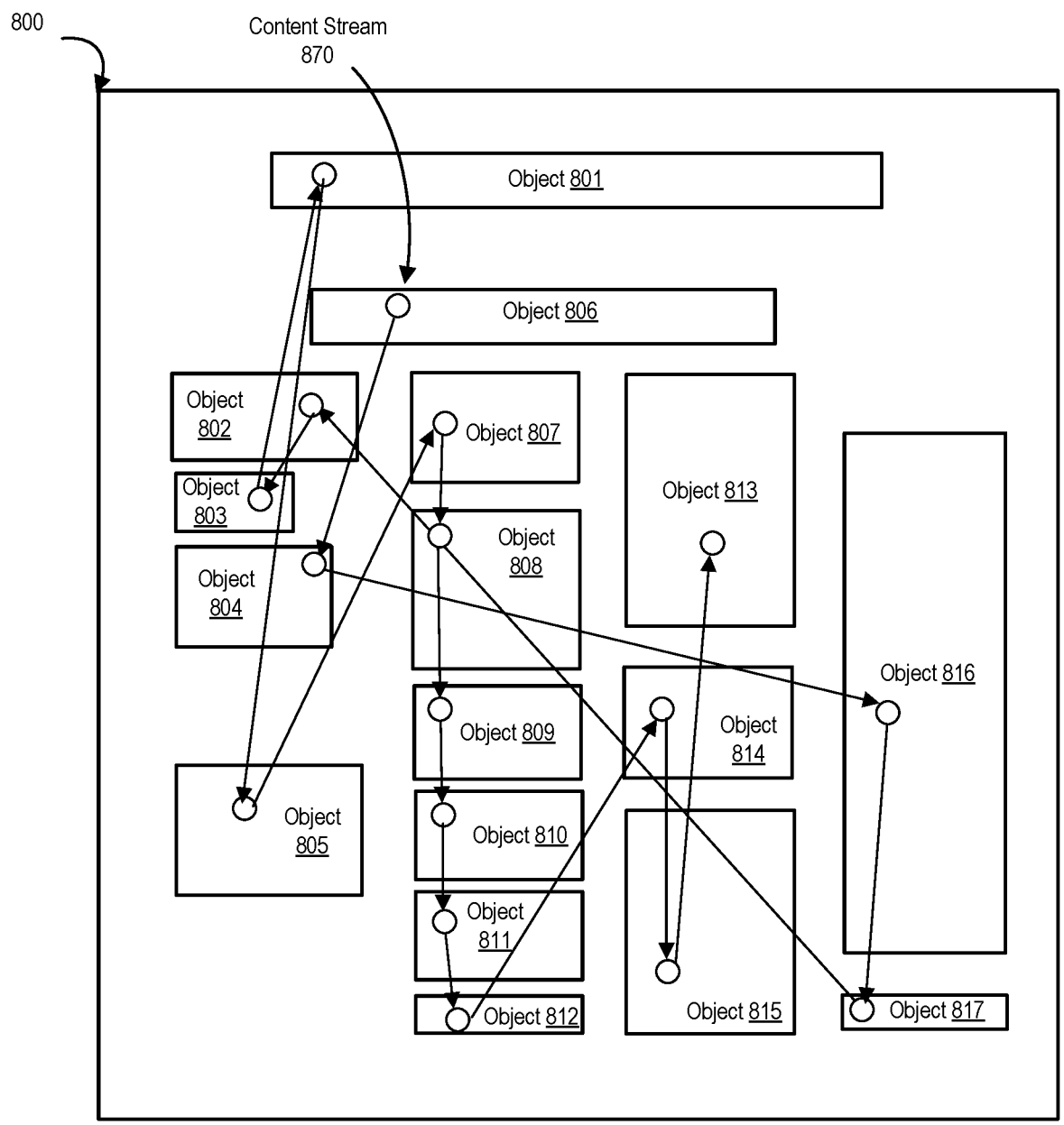
FIG. 8 is a diagram depicting an example of an electronic document including a content stream and objects, according to an embodiment of the present disclosure.

FIG. 8 is a diagram depicting an example of an electronic document including a content stream and objects, according to an embodiment of the present disclosure. FIG. 8 includes electronic document 800 having objects 801-817 and an associated content stream 870. Objects 801-817, which can be text boxes, images, and so forth, are distributed across the page of electronic document 800, loosely organized into columns in places. Content stream 870 includes objects 801-817 in an order of object 806, 804, 816, 817, 802, 803, 801, 805, 807-812, 814-815, and 813. In this example, in places, contents stream 870 tracks a natural reading order (e.g., 807-812), but in other places it does not (e.g., starting with object 802, then moving to object 805).

Figure 9:
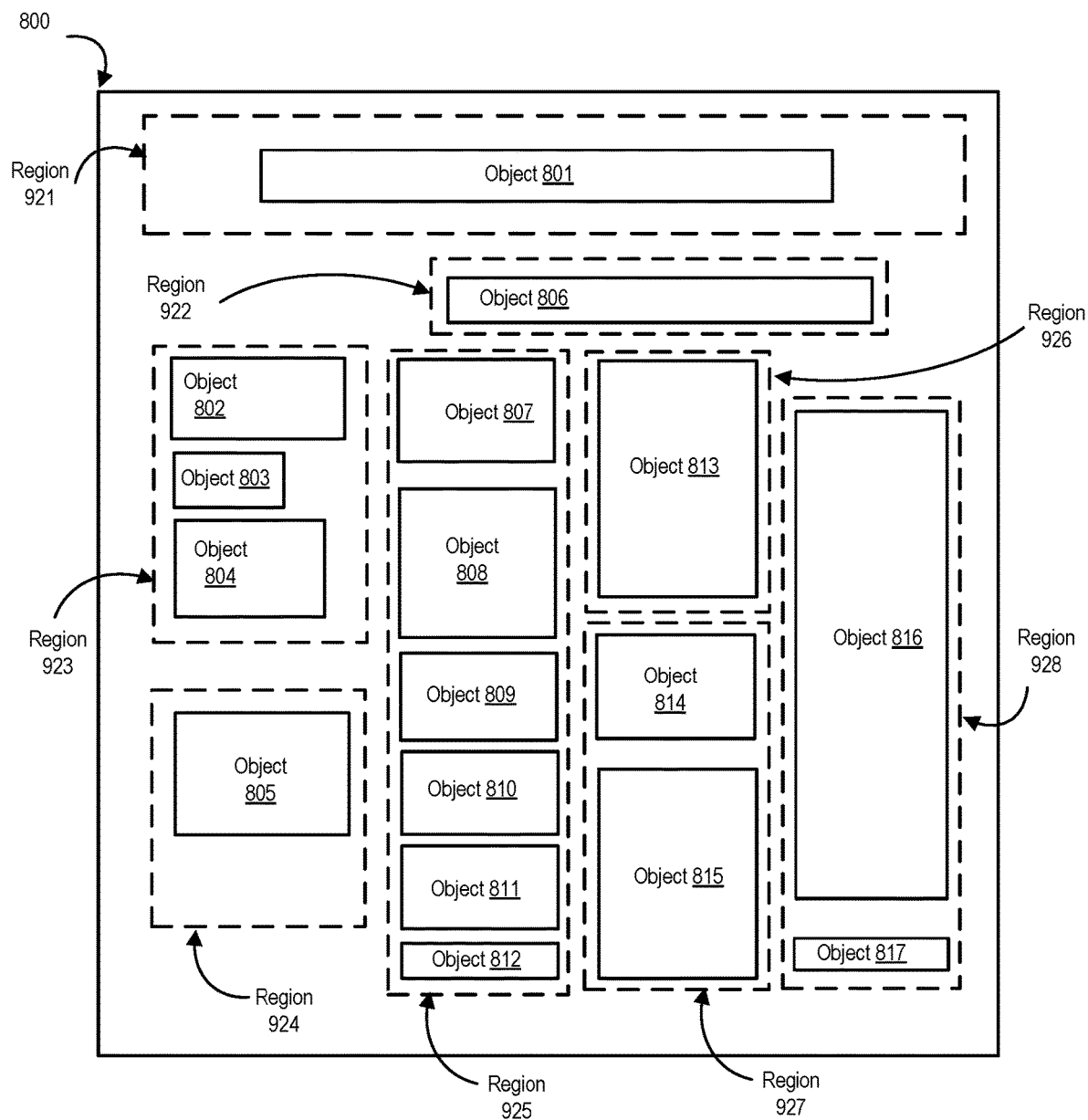
FIG. 9 is a diagram depicting objects with identified regions within an electronic document, according to an embodiment of the present disclosure.

FIG. 9 is a diagram depicting objects with identified regions within an electronic document, according to an embodiment of the present disclosure. FIG. 9 depicts electronic document 800, which includes objects 801-817 placed into regions 921-928 by document processing application 102 by using process 200. In this example, region 921 includes object 801 only and region 922 includes object 806 only. Region 923 includes objects 802-804, which are arranged loosely into a column. Region 924 includes object 805 only. Region 925 includes objects 807-812, which are arranged loosely into a column. Region 926 includes object 813 and region 927 includes objects 814 and 815. Finally, region 928 includes objects 816 and 817.

Figure 10:
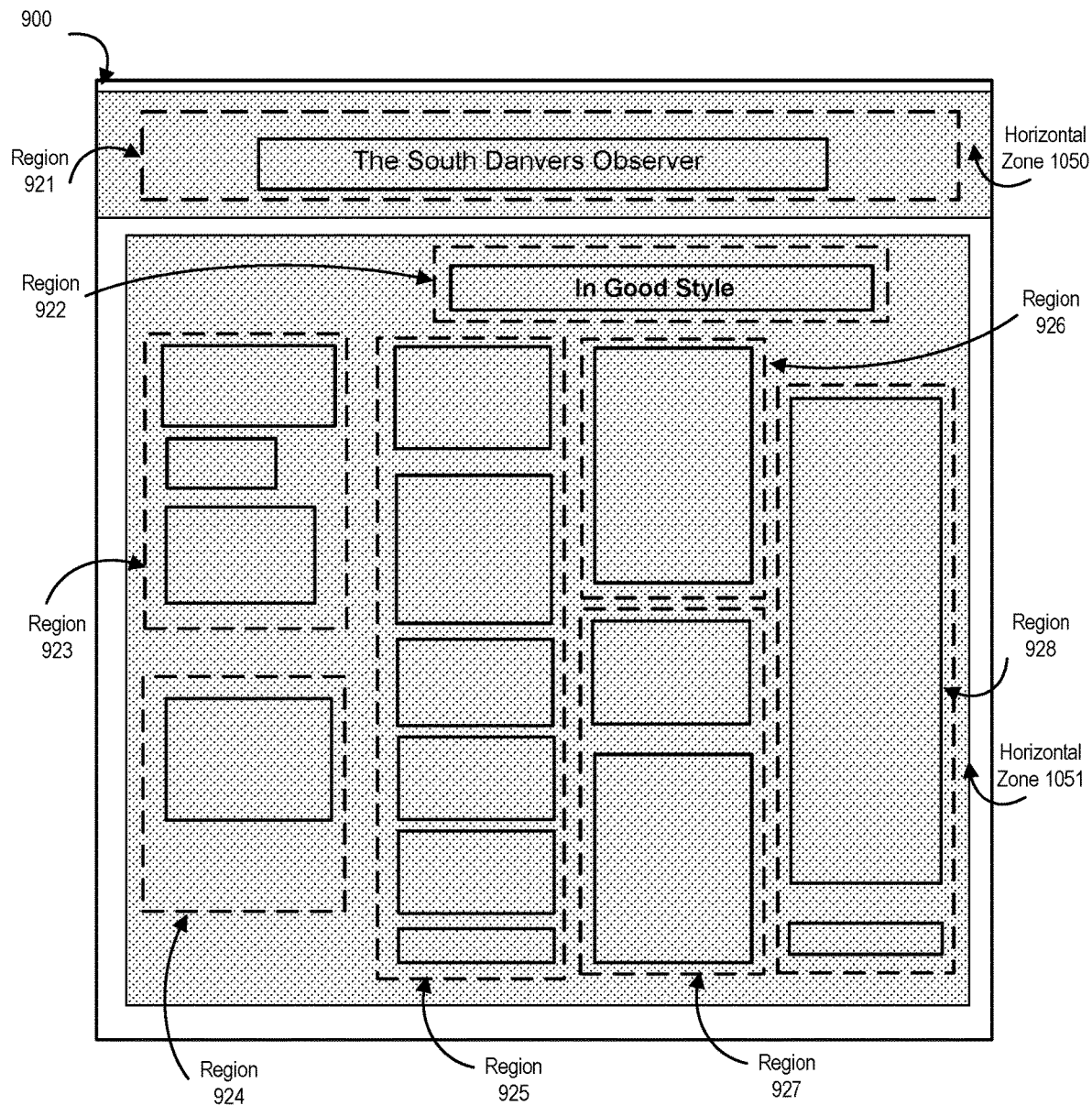
FIG. 10 is a diagram depicting regions with identified horizontal zones within an electronic document, according to an embodiment of the present disclosure.

FIG. 10 is a diagram depicting regions with identified horizontal zones within an electronic document, according to an embodiment of the present disclosure. In this example, electronic document 800 includes horizontal zones 1050 and horizontal zone 1051 that have been identified by document processing application 102. The document processing application 102 identifies that regions 921 and 922 as being (i) separated by an area of unused space, (ii) adjacent in the vertical dimension, and (iii) aligned in the horizontal dimension. This results in the creation of horizontal zone 1050, which includes region 921, and horizontal zone 1051, which includes regions 922-928.

Figure 11:
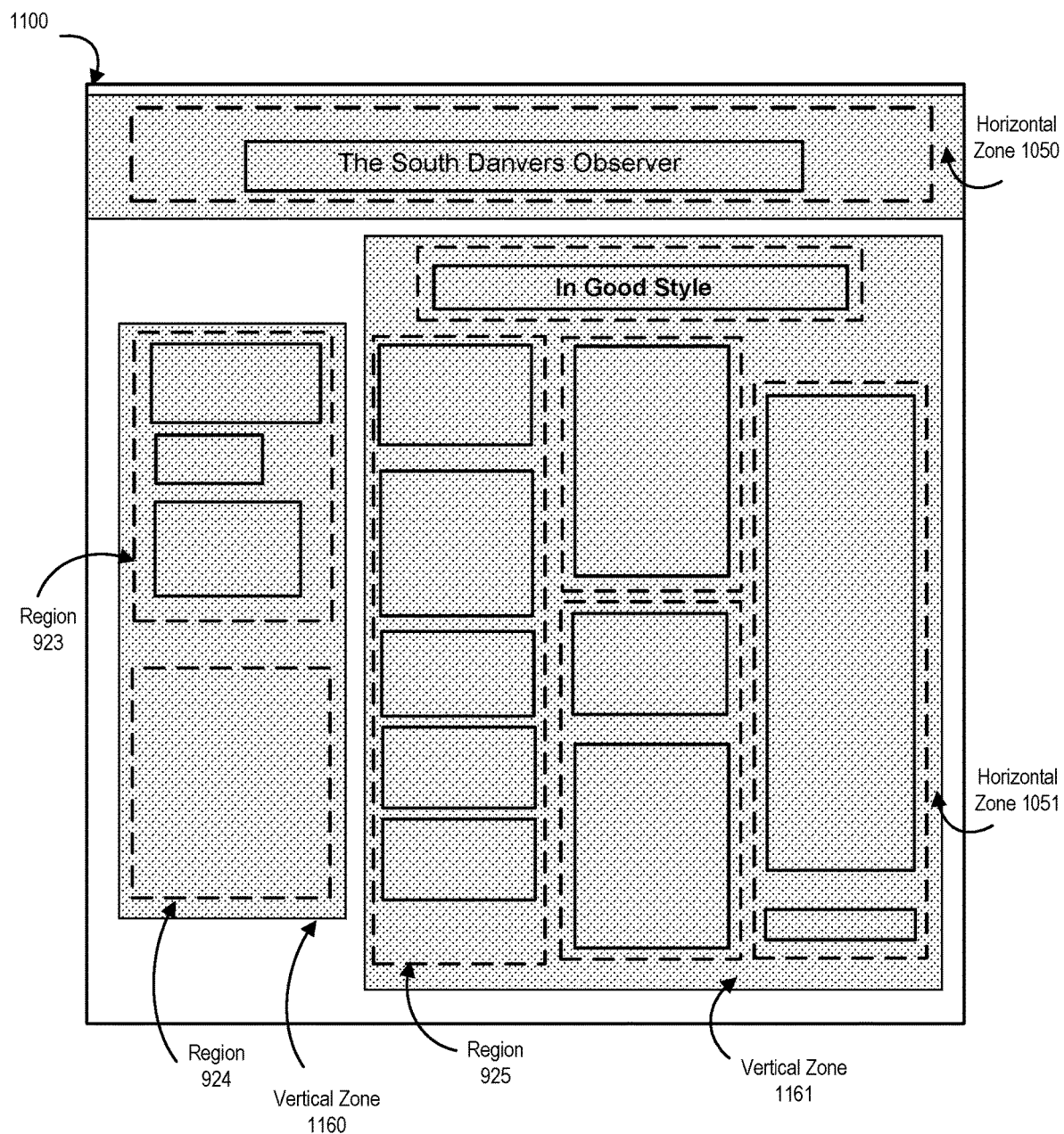
FIG. 11 is a diagram depicting regions with identified vertical zones within an electronic document, according to an embodiment of the present disclosure.

FIG. 11 is a diagram depicting regions with identified vertical zones within an electronic document 1100. In this example, the electronic document 1100 includes horizontal zones 1050 and horizontal zone 1051. Document processing application 102 identifies vertical zones 1160 and 1161 based on an area of unused space being (i) across electronic document 800 in the vertical dimension, (ii) a combination of regions 923 and 924 and region 925 being adjacent in the vertical dimension, and (iii) the combination of regions 923 and 924 and region 925 being aligned in the horizontal dimension.

Figure 12:
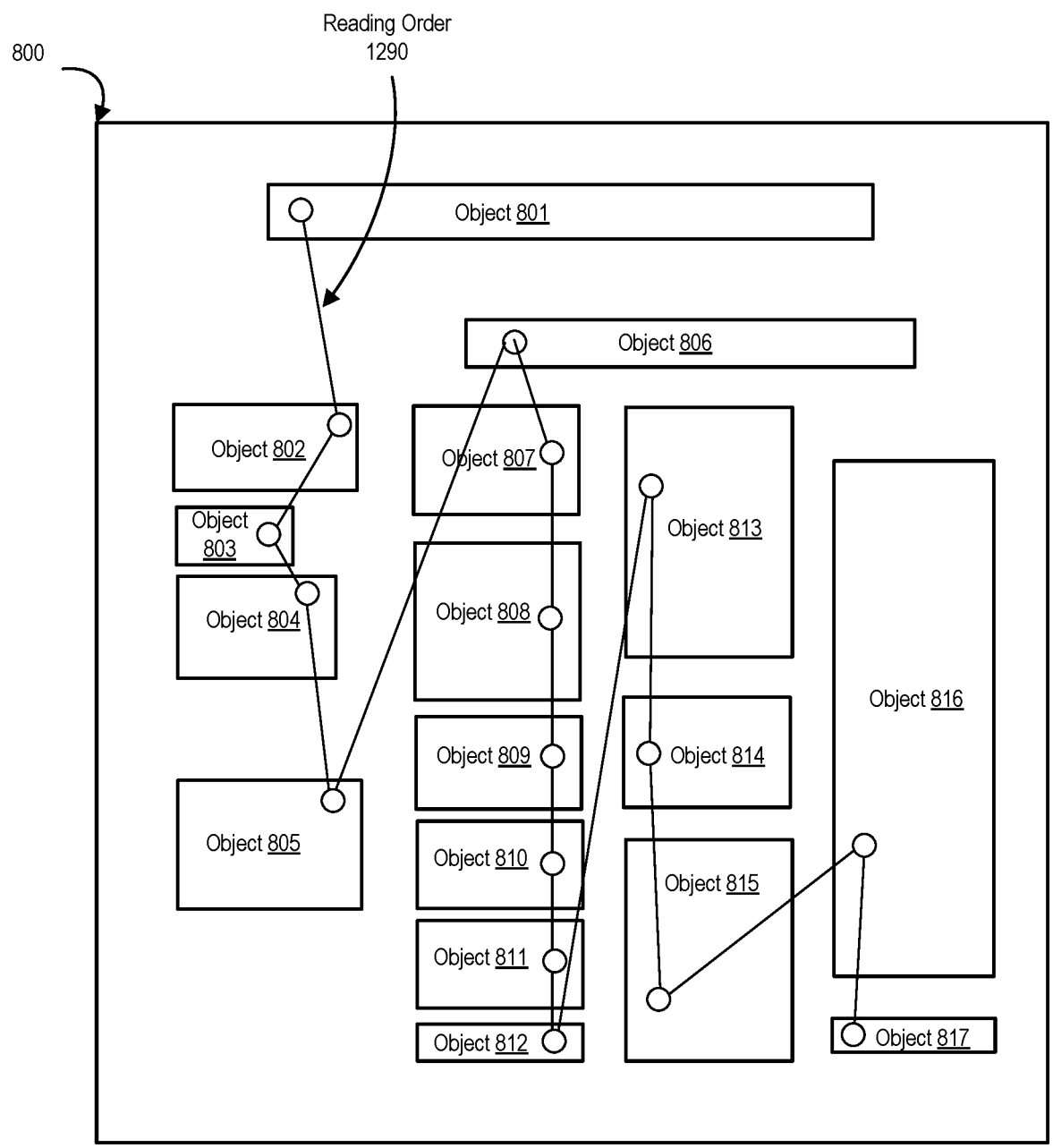
FIG. 12 is a diagram depicting a reading order within an electronic document, according to an embodiment of the present disclosure.

FIG. 12 is a diagram depicting a reading order 1290 that the electronic document application 102 has determined for the electronic document 800. As described in other examples above, any objects within an upper horizontal zone are positioned in the reading order before objects in a lower horizontal zone, any objects within a leftward vertical zone of a horizontal zone are positioned in the reading order before objects in a rightward vertical zone of the same horizontal zone, and objects within a region are ordered based on their vertical positioning. Thus, the reading order 1290 is the sequence of objects 801, 802, 803, 804, 805, 806, 807, 808, 809, 810, 811, 812, 813, 814, 815, 816, and 817.

Figure 13:
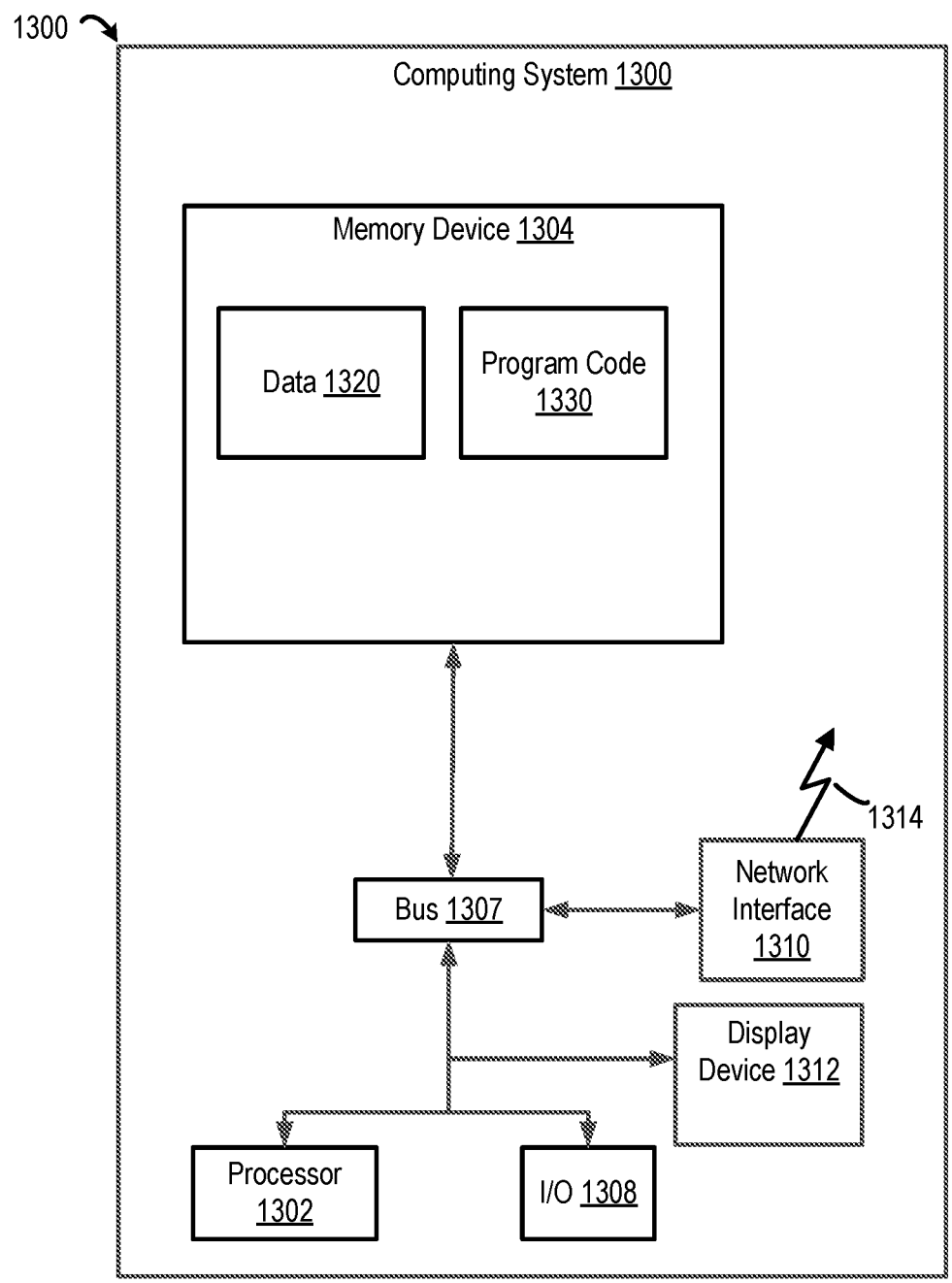
FIG. 13 is a diagram depicting an exemplary computing system for implementing a document processing application, according to an embodiment of the present disclosure.

FIG. 13 is a diagram depicting an example of a computing system for implementing certain embodiments of the present disclosure. FIG. 13 depicts computing device 1300, which is an example of computing system 101 and can execute document processing application 102. Any suitable computing system may be used for performing the operations described herein. The depicted example of a computing device 1300 includes a processor 1302 communicatively coupled to one or more memory devices 1304. The processor 1302 executes computer-executable program code 1330 stored in a memory device 1304, accesses data 1320 stored in the memory device 1304, or both. Examples of the processor 1302 include a microprocessor, an application-specific integrated circuit ("ASIC"), a field-programmable gate array ("FPGA"), or any other suitable processing device. The processor 1302 can include any number of processing devices or cores, including a single processing device. The functionality of the computing device may be implemented in hardware, software, firmware, or a combination thereof.

The memory device 1304 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a flash memory, a ROM, a RAM, an ASIC, or any other medium from which a processing device can read instructions. The instructions may include processor-specific instructions generated by a compiler or an interpreter from code written in any suitable computer-programming language, including, for example, C, C++, C #, Visual Basic, Java, or scripting language.

The computing device 1300 may also include a number of external or internal devices, such as input or output devices. For example, the computing device 1300 is shown with one or more input/output ("I/O") interfaces 1308. An I/O interface 1308 can receive input from input devices or provide output to output devices. One or more busses 1307 are also included in the computing device 1300. The bus 1307 communicatively couples one or more components of a respective one of the computing device 1300.

The computing device 1300 executes program code 1330 that configures the processor 1302 to perform one or more of the operations described herein. For example, the program code 1330 causes the processor to perform the operations described in FIG. 2 or 3.

The computing device 1300 also includes a network interface device 1310. The network interface device 1310 includes any device or group of devices suitable for establishing a wired or wireless data connection to one or more data networks. The network interface device 1310 may be a wireless device and have an antenna 1314. The computing device 1300 can communicate with one or more other computing devices implementing the computing device or other functionality via a data network using the network interface device 1310.

The computing device 1300 can also include a display device 1312. Display device 1312 can be a LCD, LED, touch-screen or other device operable to display information about the computing device 1300. For example, information could include an operational status of the computing device, network status, etc.

General Considerations

Numerous specific details are set forth herein to provide a thorough understanding of the claimed subject matter. However, those skilled in the art will understand that the claimed subject matter may be practiced without these specific details. In other objects, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes poses of example rather than limitation, and does not preclude the inclusion of such modifications, variations, and/or additions to the present subject matter as would be readily apparent to one of ordinary skill in the art.

The invention claimed is:

1. A method comprising:
    accessing a content stream of an electronic document, the content stream comprising a sequence of a first object with a first location within the electronic document, a second object with a second location within the electronic document, a third object with a third location within the electronic document, and a fourth object with a fourth location within the electronic document;
    computing, from the content stream, a first region and a second region by:
        determining, from the content stream, that the second object follows the first object in the sequence;
        responsive to determining, from the content stream, that the second object follows the first object in the sequence, identifying boundaries of the first region by determining, from the first location and the second location, that the second object is adjacent to the first object in a vertical dimension, at least a first portion of the first object, and at least a second portion of the second object are aligned in a horizontal dimension; and
        responsive to determining, from the content stream, that the third object follows the second object in the sequence and that the boundaries of the first region do not intersect or encompass the third object, identifying the first region as encompassing the first object and the second object, excluding the third object from the first region, and adding the third object to the second region;
    determining, from the content stream, a third region comprising the fourth object;
    responsive to identifying an area of unused space that is across the electronic document in the horizontal dimension and adjacent to the first region in the vertical dimension, identifying a first horizontal zone comprising the first region and the second region and a second horizontal zone comprising the third region;
    creating, according to the first horizontal zone and the second horizontal zone, a reading order of the electronic document by ordering the first object followed by the second object followed by the third object followed by the fourth object; and
    outputting a document layout for the electronic document that that positions the first object, the second object, and the third object according to the reading order.

2. The method of claim 1, further comprising:
    responsive to identifying an additional area of unused space that is within the first horizontal zone and between the first region and the second region, identifying:
    a first vertical zone comprising the first region, and
    a second vertical zone comprising the second region.

3. The method of claim 1, wherein one or more of the first object, the second object, the third object, and the fourth object is one of text, an image, or a table.

4. The method of claim 1, further comprising:
    identifying, within the electronic document, a list comprising a plurality of items;
    and identifying each item of the plurality of items as a separate object.

5. The method of claim 1, further comprising identifying a table within the electronic document and identifying the table as an object.

6. The method of claim 1, further comprising identifying, within the electronic document, a chart, a flowchart, or an image as an object.

7. A non-transitory computer-readable medium storing instructions that, when executed by one or more processing devices, cause the one or more processing devices to perform operations comprising:
    accessing a content stream of an electronic document, the content stream comprising a sequence of a first object with a first location within the electronic document, a second object with a second location within the electronic document, a third object with a third location within the electronic document, and a fourth object with a fourth location within the electronic document;
    computing, from the content stream, a first region and a second region by:
        determining, from the content stream, that the second object follows the first object in the sequence;
        responsive to determining, from the content stream, that the second object follows the first object in the sequence, identifying boundaries of the first region by determining, from the first location and the second location, that the second object is adjacent to the first object in a vertical dimension, at least a first portion of the first object, and at least a second portion of the second object are aligned in a horizontal dimension; and
        responsive to determining, from the content stream, that the third object follows the second object in the sequence and that the boundaries of the first region do not intersect or encompass the third object, identifying the first region as encompassing the first object and the second object, excluding the third object from the first region, and adding the third object to the second region;

determining, from the content stream, a third region comprising the fourth object;

responsive to identifying an area of unused space that is across the electronic document in the horizontal dimension and adjacent to the first region in the vertical dimension, identifying a first horizontal zone comprising the first region and the second region and a second horizontal zone comprising the third region;

creating, according to the first horizontal zone and the second horizontal zone, a reading order of the electronic document by ordering the first object followed by the second object followed by the third object followed by the fourth object; and outputting a document layout for the electronic document that that positions the first object, the second object, and the third object according to the reading order.

8. The non-transitory computer-readable medium of claim 7, wherein one or more of the first object, the second object, the third object, and the fourth object is one of (i) text, (ii) an image, or (iii) a table.

9. The non-transitory computer-readable medium of claim 7, wherein the operations further comprise:
identifying, within the electronic document, a list comprising a plurality of items;
and identifying each item of the plurality of items as a separate object.

10. The non-transitory computer-readable medium of claim 7, wherein the operations further comprise identifying a table within the electronic document and identifying the table as an object.

11. The non-transitory computer-readable medium of claim 7, wherein the operations further comprise identifying, within the electronic document, a chart, a flowchart, or an image as an object.

12. The non-transitory computer-readable medium of claim 7, wherein the operations further comprise:
responsive to identifying an additional area of unused space that is within the first horizontal zone and between the first region and the second region, identifying:
a first vertical zone comprising the first region, and
a second vertical zone comprising the second region.

13. A system comprising:
a processing device; and
a memory device communicatively coupled to the processing device and comprising program instructions, wherein when executed, cause the processing device to perform operations comprising:
accessing a content stream of an electronic document, the content stream comprising a sequence of a first object with a first location within the electronic document, a second object with a second location within the electronic document, and a third object with a third location within the electronic document, and a fourth object with a fourth location within the electronic document;
computing, from the content stream, a first region and a second region by:
determining, from the content stream, that the second object follows the first object in the sequence;
responsive to determining, from the content stream, that the second object follows the first object in the sequence, identifying boundaries of the first region by determining, from the first location and the second location, that the second object is adjacent to the first object in a horizontal dimension, at least a first portion of the first object, and at least a second portion of the second object are aligned in a vertical dimension; and
responsive to determining, from the content stream, that the third object follows the second object in the sequence and that the boundaries of the first region do not intersect or encompass the third object, identifying the first region as encompassing the first object and the second object excluding the third object from the first region, and adding the third object to the second region;

determining, from the content stream, a third region comprising the fourth object;

responsive to identifying an area of unused space that is across the electronic document in the horizontal dimension and adjacent to the first region in the horizontal dimension, identifying a first vertical zone comprising the first region and the second region and a second vertical zone comprising the third region;

creating, according to the first vertical zone and the second vertical zone, a reading order of the electronic document by ordering the first object followed by the second object followed by the third object followed by the fourth object; and outputting a document layout for the electronic document that that positions the first object, the second object, and the third object according to the reading order.

14. The system of claim 13, wherein the program instructions further cause the processing device to perform operations comprising:
responsive to identifying an additional area of unused space that is within the first vertical zone and between the first region and the second region, identifying:
(v) a first horizontal zone comprising the first region, and
(vi) a second horizontal zone comprising the second region.

15. The system of claim 13, wherein one or more of the first object, the second object, the third object, and the fourth object is one of text, an image, or a table.

16. The system of claim 13, wherein the program instructions further cause the processing device to perform operations comprising:
identifying, within the electronic document, a list comprising a plurality of items;
and identifying each item of the plurality of items as a separate object.

17. The system of claim 13, wherein the program instructions further cause the processing device to perform operations comprising identifying, within the electronic document, a table; and identifying the table as an object.

* * * * *